June 1, 1971   H. C. SCHROEDER   3,581,346
CENTRIFUGAL CASTING MOLD

Filed April 30, 1969   2 Sheets-Sheet 1

INVENTOR
HARRY C. SCHROEDER

Smith Michael,
Bradford & Gardiner
ATTORNEYS

June 1, 1971  H. C. SCHROEDER  3,581,346
CENTRIFUGAL CASTING MOLD
Filed April 30, 1969  2 Sheets-Sheet 2

INVENTOR
HARRY C. SCHROEDER

Smith Michael
Bradford Gardner
ATTORNEYS

United States Patent Office 3,581,346
Patented June 1, 1971

3,581,346
CENTRIFUGAL CASTING MOLD
Harry C. Schroeder, 1625 Graham Road,
Stow, Ohio 44224
Continuation-in-part of abandoned application Ser. No.
777,646, Nov. 21, 1968. This application Apr. 30, 1969,
Ser. No. 820,372
Int. Cl. B29c 5/04
U.S. Cl. 18—26                                      7 Claims

ABSTRACT OF THE DISCLOSURE

The invention deals with an improved aluminum, multipart receptacle type of casting mold for the centrifugal casting of granular or powder from thermoplastic materials; the improvement residing in the use of smooth surfaced flanges and unique registering means at the parting line between mold parts; the registering means being comprised of elongated, generally rectangular and tapered registering lugs on the upper mold part cooperating with similarly shaped register openings on the lower mold part to facilitate cleaning of the abutting faces of the parts.

---

This invention is concerned particularly with molds for use on centrifugal casting machines. In particular, the invention is directed to the mold structure at the parting line between cooperating mold parts. This application is a continuation-in-part of my prior application Ser. No. 777,646, filed Nov. 21, 1968, now abandoned.

Centrifugal casting of powder or granular plastic materials, particularly in the manufacture of hollow articles such as balls, plastic toys, etc., involves the use of generally two part receptacle type molds mounted on spiders. The spiders are suitably mounted on radial arms of the casting machine; which arms are rotated about the central vertical axis of the machine and are also rotated about their own longitudinal axis thus imparting to the spider carried molds a gyratory motion tending to spread any material within the molds uniformly over the surfaces thereof.

The casting material now preferably used is a thermosetting or heat polymerizable plastic material in powder form of which there are a number available on the commercial market. These materials are introduced into cold molds of a centrifugal casting machine, the molds are then gyrated to distribute the powder evenly over the casting surface. The molds are simultaneously heated to cause transformation of the material from powdered to fused state by polymerization or some similar physical change. Because heat is involved in centrifugal casting, the heat conductivity of the mold parts is critical. Since aluminum is among the best of heat conductive materials, it is widely used in the centrifugal casting of plastics to take full advantage of this property. In addition aluminum itself can be cast, though at much higher temperatures than the plastic or plasticoidal materials, thus very intricately shaped molds for casting of intricately shaped plastic products can be readily made.

One problem however, has plagued the centrifugal casting industry. This problem is mold breakage with attendant loss of production and expense of replacement. Careful evaluation has revealed that most mold breakage is due to compressive failure at the juncture between mating mold parts. In most instances this failure can be attributed directly to the buildup during production of unwanted plastic on the abutting faces of these parts and the ultimate wear and destruction of the registration means due to repeated cleaning of the mold parts of unwanted plastic. Reference to the drawings will serve to explain the reasons for such accumulation and the concepts herein involved.

Figure 1:
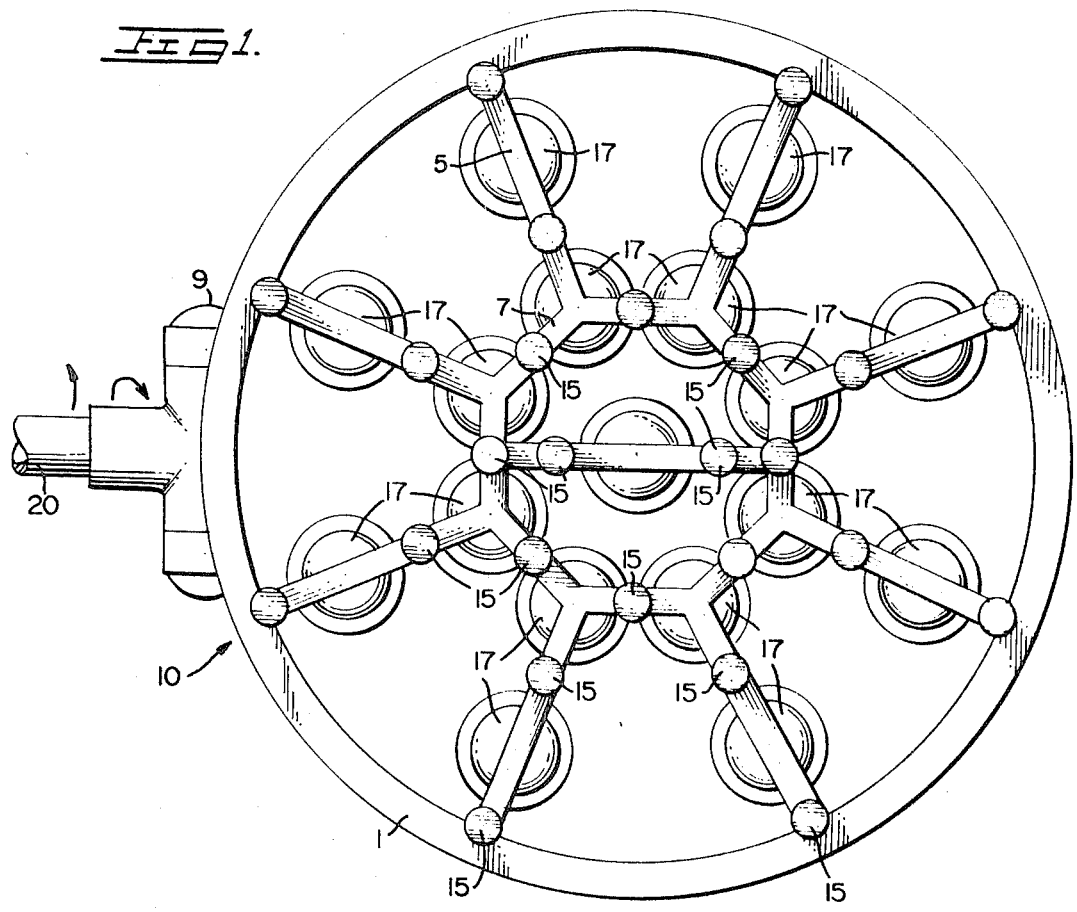
FIG. 1 is a plan view of a centrifugal casting spider.
Figure 2:
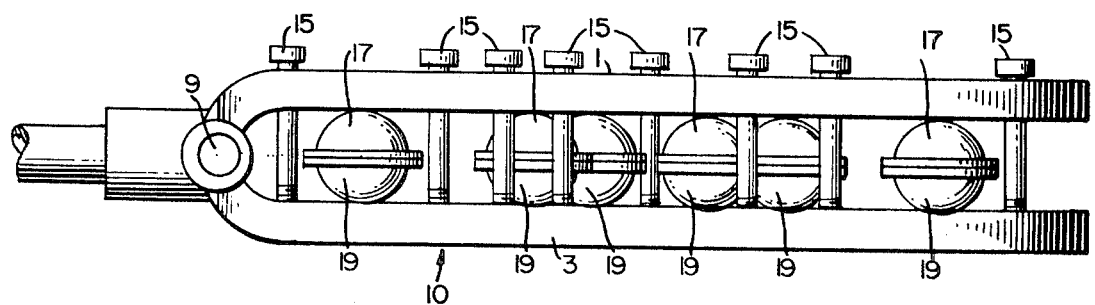
FIG. 2 is an elevational view of the spider shown in FIG. 1.

As shown in FIGS. 1 and 2 the conventional casting spider 10 is comprised of two hingedly connected wheel-like frames 1 and 3 provided with spoke-like beams 5 which are in turn interconnected by additional beams 7. The frames 1 and 3 are hingedly interconnected at pintle 9 so that frame 1 may be swung open. The hinge connection is attached by any suitable means to the arm 20 of a casting machine. As indicated by the arrows in FIG. 1 the arm is rotated about the center of the machine and also rotated about its own axis to impart to the spider 10 a gyratory motion.

Supported on spider frames 1 and 3 respectively are the upper 17 and lower 19 halves of molds into which the plasticoidal materials are introduced for casting into the finished product. As shown the molds are arranged so as to provide as many as possible on the spider while assuring that, when the spider frames are closed, the compressive load on each is distributed as evenly as possible on all portions thereof. This arrangement is intended to assure that all of the mold halves are closed tightly and evenly during the casting operation.

In order to secure the spider frame in closed position, suitable hand operated latches 15 of conventional design are spaced throughout the spider and securely latch and clamp the frames in closed position.

From the above general description it should be obvious that two considerations immediately come into play. The first is to preclude, as much as possible, any flash on the molded plastic product at the parting line of the mold parts. The second is the necessity of supplying some means of assuring accurate registration of the upper and lower mold parts 17, 19 having in mind that since the spider and mold parts are subject to repeated heating and cooling cycles which cause some dimensional change, requiring that this change be reflected equally throughout the individual molds and registration is not disturbed.

Figure 3:
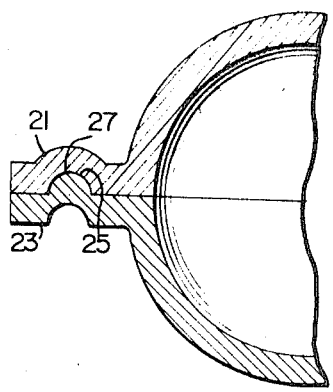
FIG. 3 is a partial sectional view of a prior art mold.

With these factors in mind, the art has developed a number of ways to accomplish the necessary registration. FIG. 3 illustrates the most often used solution comprising the provision of outwardly projecting flanges 21, 23 on the upper and lower mold parts respectively. The flanges 21, 23 further are provided with mating tongue and groove configurations 25, 27 respectively.

Figure 4:
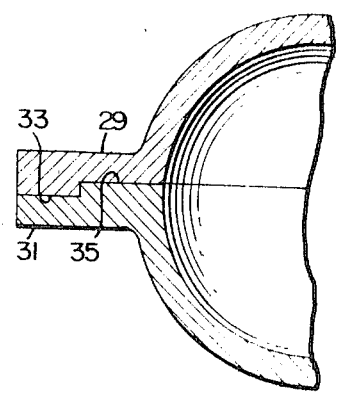
FIG. 4 is a view of another prior art device.

Another prior art solution to the problem is shown in FIG. 4 wherein again a peripheral flange 29, 31 is provided on each of the mold parts. In this case the mating surfaces of the flange are defined by stepped circumscribing areas 33, 35. In both prior art solutions a serious problem ultimately develops as the molds are subject to repeated use. This is the breakage of molds due to unavoidable accumulation of plastic in the groove 27 of FIG. 3 or at the base of the step 35, FIG. 4. Experience has shown that, despite precautions, there will be some spillage of the plastic powder on the mold flanges when the powder is introduced during the start of a molding cycle. Eventual accumulation of plastic in these hard to clean areas results, and unless considerable care and time is spent to remove this accumulation the progressive result of more and more accumulation particularly at the dirty areas will cause mold breakage because the full compressive load exerted by the spider frames produces local areas of stress at the points where accumulation has occurred. Also due to the repeated cleaning necessary for use of the prior art molds, substantial wear of the registration means occurs quite rapidly with the result that the mold parts no longer register properly and must be discarded.

Figure 5:
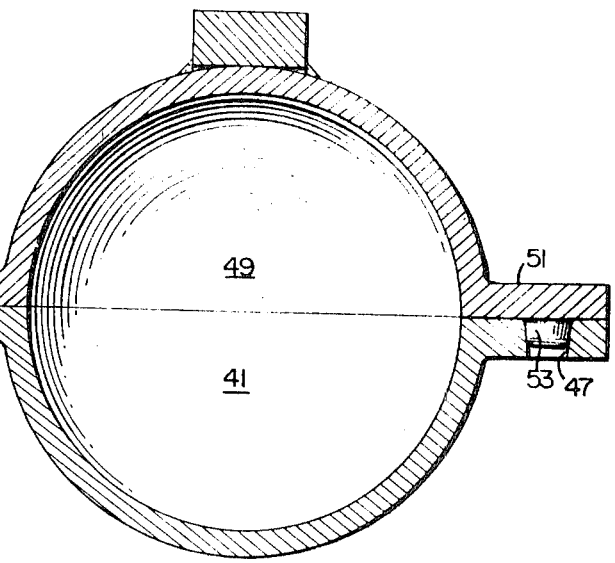
FIG. 5 is a view similar to FIGS. 3 and 4 but showing the invention herein disclosed.
Figure 6:
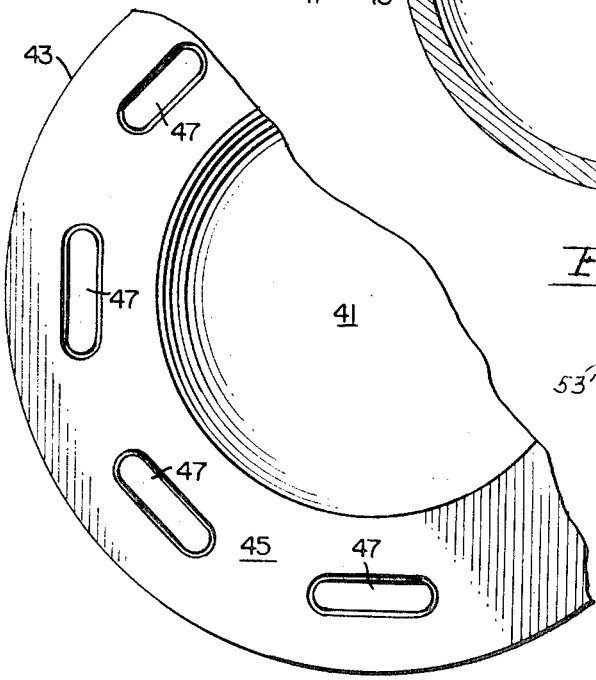
FIG. 6 is a top plan view of a bottom mold part.

The present invention meets the problem, as shown in FIGS. 5 and 6 by eliminating the conventional registration means and in lieu thereof the lower mold part 41 is provided with an outwardly projecting flange 43 having a perfectly smooth flat surface 45. At spaced points around the mold the smooth surface flange 43, is provided with apertures 47 which pass completely therethrough.

Apertures 47 are particularly shaped as rectangular holes having a length to width ratio of at least 3½ to 4½ to 1 with the longer axis of the rectangle generally on a tangent to a line circumscribing the mold 41 and disposed generally at the midpoint of the width of flange 43. In all cases the apertures are disposed outside of the main wall of the mold so that they are always open clear through the flange.

As clearly illustrated in FIG. 5, the side walls of aperture 47 converge downwardly and the juncture between wall 47 and surface 45 is rounded so that all sharp edges at this juncture are eliminated.

The upper mold part 49 is provided with a flange 51. This flange is provided with registration lugs 53 which lugs are positioned at spaced points on the flange so as to register with the apertures 47 in flange 43 of the lower mold part 41. As illustrated in FIG. 5 the cross-sectional shape of registration lugs 53 is precisely shaped to seat within the apertures 47 so that when mold parts are closed the lugs 53 are engaged within apertures 47 with as precise a fit as is possible within normal casting tolerances and engineering skills. The convergent walls of aperture 47 coupled with the complementary shape of lug 53 act to guide the mold parts into complete registration when the spider frames 1 and 3 are closed and compressively latched by latches 15. Note too that base juncture of the side walls of the lugs with the flange surface is a smooth curve to eliminate any areas where plastic would tend to accumulate.

The advantages of the described arrangement are multifold. Because flange 43 is provided with a smooth surface it is a relatively easy operation to clean this flange after every loading cycle by the simple expedient of brushing same. Also since apertures 47 pass clear through the flange 43 any plastic powder can easily fall through and no residue is left on flange 43.

Additionally, the shape of apertures 47 and lugs 53 is such that accurate registration between mold parts 49 and 41 is obtained despite any warpage and because of the guiding effect obtained by the wall configuration given to both aperture 47 and lug 53.

Finally, the rectangular plan configuration of lugs 53 serves to provide sufficient strength to prevent lug breakage due to lateral stresses imposed thereon and thus the lugs can be cast integrally with mold part 49. The expensive machining that would be required to use conventional hardened steel registration pins and the expansion difficulties inherent in such practice are completely eliminated.

Figure 7:
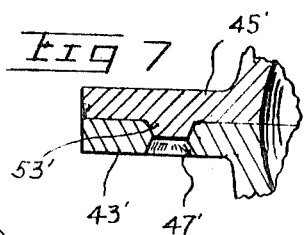
FIG. 7 is an elevational view of a modified form of the invention.

A further modification of the basic concept is disclosed in FIG. 7. As shown, the elongated lug 53' is distinguished by being provided with sides having a greater stoop than that of lug 53. Further lug 53' is not as deep, i.e. it does not project outwardly from flange 51' as far as does lug 53. Additionally, aperture 47' is shaped so as to include walls which diverge outwardly toward the outer surfaces of flange 43'. The walls converge inwardly to form a narrow neck positioned in a plane approximately midway of the thickness of the flange 43.

It has been found that, aside from more easy registration due to the greater slope to the contacting walls, much more economical manufacture of the mold parts is effected because less hand fitting and finishing is required than that form of the invention shown in FIGS. 5 and 6. Because there is no undercut aperture the mold part 41' with flange 43' may be easily cast with accurate cores and copes. Thus with a little extra care in casting the upper mold half 49' may be easily cast so that almost perfect registration is obtained with as cast parts with none, if any, hand finishing. A further plus is that with lug 53' being less deep than that of lug 53 in FIG. 5, there is little sticking when the molds are parted to remove a cast plastic product. In order to facilitate registration the side walls of lug 53' are sloped at an angle no greater than 70° as measured from the face of the flange. The walls of apertures are sloped correspondingly.

Therefore, what is claimed is:

1. For use in centrifugal casting of plasticoidal materials, at least a pair of upper and lower cooperating, receptacle type of mold parts; flange means circumscribing said mold parts and projecting outwardly therefrom, said flanges having opposed surfaces for face-to-face abutment when the mold parts are closed, the flange on one mold part having apertures extending completely therethrough, said apertures having a generally elongated rectangular configuration and being defined by walls convergent away from said surface; and being located outside of the wall of the mold part; the flange on the cooperating mold part being provided with downwardly projecting registration lugs at spaced points, the lugs being spaced and configured for entry into said apertures and tight engagement with the walls thereof to cause registration of the mold halves; said flanges and said lugs being cast integrally with the respective mold parts.

2. The structure as defined in claim 1 wherein the length to width ratio of the apertures is at least 3½ to 4½ to 1.

3. The structure as defined in claim 1 wherein the mold parts are cast entirely of aluminum.

4. The structure as defined in claim 1 wherein the juncture between the apertures and the abutment surface of said flange is a smooth curve.

5. The structure as defined in claim 1 wherein the juncture between the walls of the registration lugs and a given flange is a smooth surface.

6. The structure as defined in claim 1 including further the combination of a pair of centrifugal casting spider frames supporting said mold parts, said spider frames being disposed in superposed relation when at rest; the lower spider frame carrying the mold part having the apertured flange whereby spillage may be readily removed from said flange by brushing.

7. The structure defined in claim 1 wherein the registration lugs are defined by walls having a slope angle of no greater than 70° as measured from the face of the flange and wherein the apertures in the other mold part include walls diverging outwardly toward the top and bottom surfaces of the flanges from a juncture line circumscribing the interior of said aperture, the slope of the walls conforming to that of the walls of said lugs.

References Cited

UNITED STATES PATENTS

| | | | |
|---|---|---|---|
| 2,932,854 | 4/1960 | Stetina | 18—26AX |
| 3,173,175 | 3/1965 | Lemelson | 18—26A |
| 3,192,568 | 7/1965 | Nicholls | 18—39 |
| 3,204,959 | 9/1965 | Nicholls | 18—26AX |

WILLIAM S. LAWSON, Primary Examiner

U.S. Cl. X.R.

18—39, 43